(12) United States Patent
Schmithuesen

(10) Patent No.: US 11,413,568 B2
(45) Date of Patent: Aug. 16, 2022

(54) COMPRESSED-AIR DRYING DEVICE

(71) Applicant: Manitowoc Crane Group France SAS, Dardilly (FR)

(72) Inventor: Thomas Schmithuesen, Schortens (DE)

(73) Assignee: Manitowoc Crane Group France SAS, Dardilly (FR)

( * ) Notice: Subject to any disclaimer, the term of this patent is extended or adjusted under 35 U.S.C. 154(b) by 427 days.

(21) Appl. No.: 16/526,640

(22) Filed: Jul. 30, 2019

(65) Prior Publication Data

US 2020/0038799 A1    Feb. 6, 2020

(30) Foreign Application Priority Data

Jul. 31, 2018 (DE) .......................... 202018104403.6

(51) Int. Cl.
*B01D 53/02* (2006.01)
*B01D 53/04* (2006.01)
(Continued)

(52) U.S. Cl.
CPC ....... *B01D 53/0438* (2013.01); *B01D 53/261* (2013.01); *F04B 39/06* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS 7,326,277 B1    2/2008 Cohen et al.
2014/0116534 A1   5/2014 Howell et al.
(Continued)

FOREIGN PATENT DOCUMENTS

CN    2141320 Y    9/1993
CN    206288509 U    6/2017
(Continued)

OTHER PUBLICATIONS

European Search Report issued by ISA/EPO in connection with European Patent Application No. 19187166 dated Sep. 18, 2019.
(Continued)

*Primary Examiner* — Christopher P Jones
(74) *Attorney, Agent, or Firm* — Cook Alex Ltd.

(57) ABSTRACT

A drying device for drying intake air fed to a compressed-air system of a vehicle includes a cooling device connected downstream of a compressor in an intake air flow path and draws off heat from the intake air coming from the compressor, a desiccant container connected downstream of the cooling device in the intake air flow path and comprising an adsorbent for removing water from the intake air flowing through the desiccant container, and a regeneration container connected downstream of the desiccant container in the intake air flow path and configured to receive a first portion of the intake air coming from the desiccant container and, as required, returns it to the desiccant container and which feeds heat, drawn off by the cooling device, to the received intake air.

6 Claims, 2 Drawing Sheets

Figure 1:
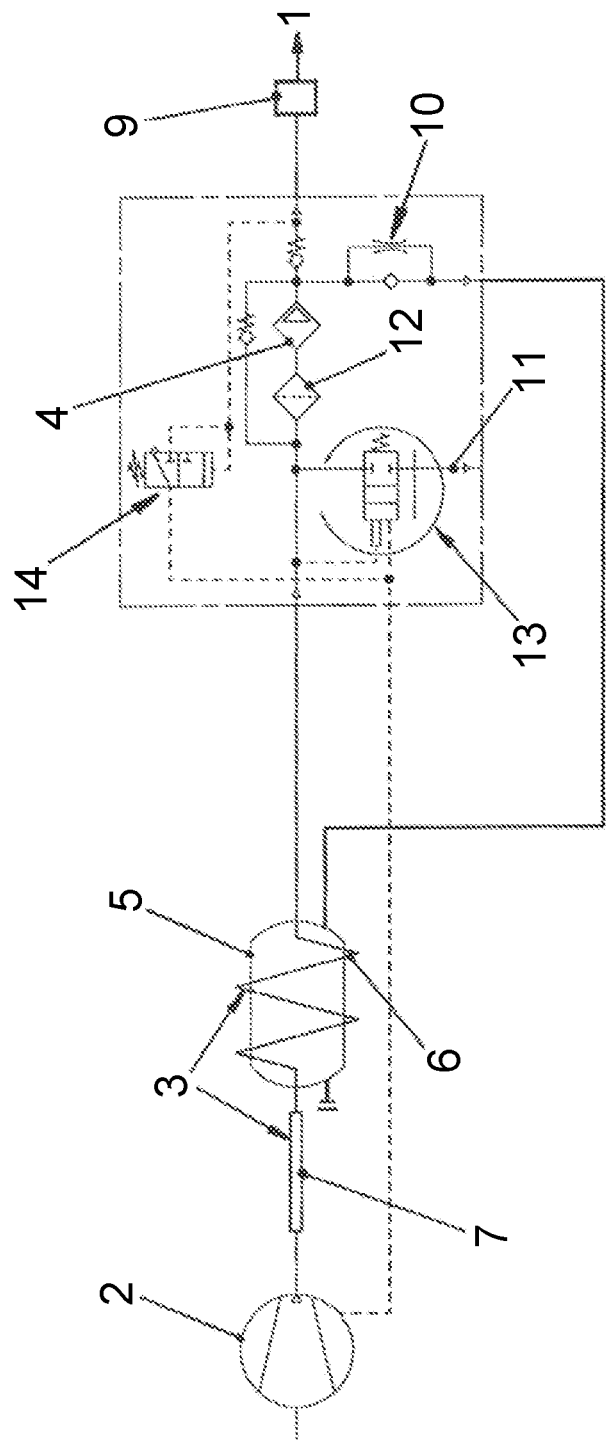

(51) Int. Cl.
*F04B 39/06* (2006.01)
*F04B 39/16* (2006.01)
*B01D 53/26* (2006.01)

(52) U.S. Cl.
CPC .......... *F04B 39/16* (2013.01); *B01D 2257/80* (2013.01); *B01D 2259/4009* (2013.01); *F04B 2205/11* (2013.01)

(58) Field of Classification Search
CPC ........ B01D 2257/80; B01D 2259/4009; B01D 2259/4566; B01D 53/0438; B01D 53/261; B60T 17/004; F04B 2205/11; F04B 39/06; F04B 39/16
See application file for complete search history.

(56) References Cited

U.S. PATENT DOCUMENTS

2015/0251645 A1    9/2015   Pfefferl et al.
2018/0209123 A1*   7/2018   Bahrami ................ B01D 5/006

FOREIGN PATENT DOCUMENTS

CN    107206992 A    9/2017
DE     19600377 A1   6/1997
KR   20170087601 A    7/2017

OTHER PUBLICATIONS

German search report dated Apr. 4, 2019 issued in corresponding German Patent Application No. 20 2018 104 403.6.
CNIPA Office Action and Search Report dated Jun. 3, 2021, and English language translations of same, issued in connection with corresponding CN Pat. Appl. 201910680921.X.
Pharmaceutical Preparation Equipment, The 2nd edition, Editor-in-chief: Zongfa, Yang, Beijing: People's Military Medical Publishing House, p. 263, "Twelfth Five-year" National Planning Textbook for Vocational Education, ISBN 978-7-5091-7516-3, and English translation of same.

* cited by examiner

COMPRESSED-AIR DRYING DEVICE

The present invention relates to a drying device for drying intake air to supply to a compressed-air system of a vehicle, in particular a mobile work machine such as a construction machine or a mobile crane.

Braking systems in construction machines, mobile cranes and similar mobile motor vehicles are generally embodied as so-called pneumatic or compressed-air brakes. In order to generate the compressed air needed, ambient air is sucked in, compressed and then dehumidified in order to prevent corrosion damage to the compressed-air system. Since the air is mostly compressed by oil-lubricated piston compressors, it is also necessary to clean the intake air.

Various drying methods for dehumidifying the compressed air are known which employ the physical principles of condensation, diffusion or sorption (absorption/adsorption). Adsorption methods are in turn sub-divided into vacuum regeneration methods, heated regeneration methods and heatless regeneration methods, depending on the regeneration type of the adsorbent used.

When the compressed air is dried by adsorption, the air which is to be dried flows through a so-called adsorbent, such that water contained in the compressed air accumulates on the inner and outer surface of a porous adsorbent, without chemically bonding in the process. To this end, the adsorbent exhibits a high surface area in order to promote the accumulation of water. Common adsorbents include aluminium oxide, silica gel and activated carbon, or also molecular sieves.

Once the adsorbent is saturated with accumulated water, the adsorbent has to be regenerated by removing the water from the adsorbent again. This so-called desorption is performed by heatless regeneration with no additional supply of heat. To this end, a portion of the previously dried compressed air is depressurised to almost ambient pressure and channelled through the saturated adsorbent. The airflow, which is extremely dry due to depressurisation, sorbs the accumulated water and is guided, with it, out of the system via an outlet valve.

In order to promote the accumulation of water on the adsorbent during adsorption drying, the temperature of the compressed air fed to the adsorbent should not be substantially higher than the temperature of the ambient air. The air which is to be dried is therefore cooled in a heat exchanger following compression, wherein the waste heat is drawn off into the environment in known systems.

However, known adsorption heatless regeneration drying methods take up a significant construction volume, which always constitutes a disadvantage in the case of non-stationary use in vehicles and in the available space which prevails therein.

It is the object of the present invention to remedy this problem and significantly reduce the construction volume of an adsorption heatless regeneration drying device as compared to known solutions.

To this end, the drying device in accordance with the invention comprises: a cooling device which is connected downstream of a compressor in the intake air flow path and draws off heat from the intake air coming from the compressor; a desiccant container which is connected downstream of the cooling device in the intake air flow path and comprises an adsorbent which removes water from the intake air flowing through the desiccant container; and a regeneration container which is connected downstream of the desiccant container in the intake air flow path and receives a first portion of the intake air coming from the desiccant container and returns it to the desiccant container as required, and which feeds the heat, drawn off by the cooling device, to the received intake air.

In other words, the heat removed via the cooling device from the air compressed by the compressor is at least partially used in accordance with the invention to heat the dried compressed air situated in the regeneration container.

This additional input of heat further increases the water-sorption capacity of the air in the regeneration container, which is already dry anyway, thus ultimately leading to improved desorption in the regeneration phase when the air coming from the regeneration container flows through the adsorbent.

The improved drying capacity of the air stored in the regeneration container enables the amount of air needed for regeneration, and consequently also the volume of the regeneration container, to be reduced, thus leading to a reduced construction volume of the drying device as compared to known solutions.

In one embodiment of the present invention, the cooling device draws off the heat, from the intake air compressed by the compressor, directly to the regeneration container. The cooling device can achieve this by directly adjoining the regeneration container or being situated in its immediate vicinity.

The cooling device can then transfer the heat to the regeneration container substantially by means of thermal radiation. Consequently, the cooling device and the regeneration container substantially do not touch. Alternatively, however, the present invention can equally provide for the flow of heat to be transferred between the cooling device and the regeneration container substantially by means of thermal conduction or heat transport (convection). Primary transfer by means of thermal conduction does however require the cooling device and the regeneration container to comprise elements which are shared or materially connected to each other directly. It should be noted here that the regeneration container, if embodied as a pressure container, must meet particular safety-related requirements. If the cooling device is structurally incorporated onto the regeneration container, these requirements must of course likewise be observed. By contrast, "spacing" the cooling device from the regeneration container, together with the associated heat transfer by means of radiation and/or heat transport, allows standardised components which are already safety-certified and thus cost-effective to be used as the cooling device and in particular the regeneration container.

In one embodiment, the cooling device can comprise and in particular be embodied as a cooling helix. While any known heat exchanger could in principle be used for the purposes of the cooling device, a cooling helix consisting of a tube bent in the shape of a spiral affords the advantage that it cannot become clogged up with ice or dirt particles, as can for example be the case with other types of heat exchangers such as plate coolers. Cooling helices require more space as compared to other heat exchangers, which one embodiment of the present invention makes use of by then having the cooling helix encircle the regeneration container circumferentially. The volume encircled by the cooling helix, which cannot otherwise be used, is consequently taken up by the regeneration container, such that the construction volume required for the drying device is thus further reduced.

A maximum reduction in the construction volume required is achieved in accordance with another embodiment of the present invention by designing the filling capacity of the regeneration container for one complete regeneration of the desiccant container. In other words, the regeneration container is dimensioned such that the amount of air stored in it is solely sufficient to achieve one complete desorption of the adsorbent provided in the desiccant container. A storage capacity of the regeneration container beyond this is not then desirable due to the construction volume additionally required for it and the lack of application for the amount of air additionally stored in the regeneration container.

Similarly, in another embodiment of the present invention, the adsorption capacity of the desiccant container can be designed for one complete charge of a pressure reservoir which receives a second portion of the intake air coming from the desiccant container and dispenses it, as required, to the compressed-air system. In other words, the nature and amount of the adsorbent provided in the desiccant container is set such that it is sufficient for precisely one charge of the pressure reservoir.

In accordance with another aspect, the present invention enables a method for drying the intake air fed to a compressed-air system of a vehicle, in particular a mobile work machine, and in particular by using a drying device as described above.

Such a method can then comprise the following steps:

drawing off heat, from intake air compressed by means of a compressor, in a cooling device which is connected downstream of the compressor in the intake air flow path;

removing water from the intake air by channelling it through a desiccant container which is connected downstream of the cooling device in the intake air flow path and comprises an adsorbent;

storing a portion of the intake air exiting the desiccant container in a regeneration container which is connected downstream of the desiccant container in the intake air flow path, wherein heat drawn off by the cooling device is fed to the stored intake air;

dispensing the intake air stored in the regeneration container, as required, to the desiccant container in order to regenerate the adsorbent contained in the desiccant container.

In the following, the invention is explained in more detail on the basis of a preferred embodiment and by referring to the enclosed figures. It can comprise any of the features described here, individually and in any expedient combination.

Figure 2:
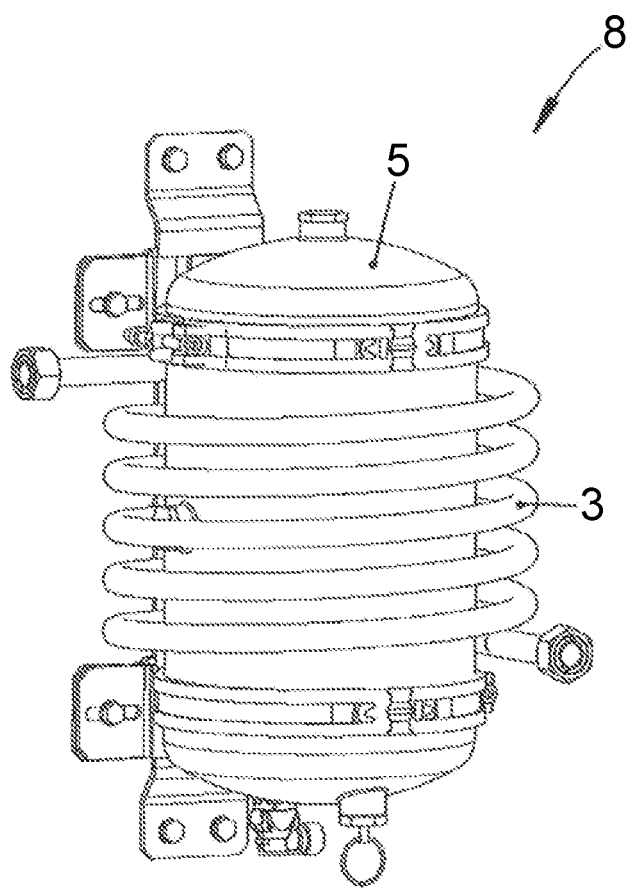

There is shown:

FIG. 1 a circuit diagram of the drying device in accordance with the invention;

FIG. 2 a perspective view of an assembly in accordance with the invention, consisting of a cooling device and a regeneration container.

FIG. 1 shows a drying device in accordance with the invention, which provides compressed air for a compressed-air system 1.

Ambient air is sucked in and compressed by means of a compressor 2. The air, which is heated by the compression, is re-cooled in a heat exchanger 3 which is connected downstream of the compressor 2, wherein the drawn-off heat is at least partially fed directly to the regeneration container 5 and the compressed air stored in it. As can be seen in FIG. 1, the heat exchanger and/or cooling device 3 is formed by a sufficiently thick and long tube which encircles, in the shape of a spiral, the regeneration container 5 which is embodied as a cylindrical pressure container. As more clearly be seen in FIG. 2, the cooling helix 6 formed from the tube 7 is then embodied such that condensate which may form in the tube 7 during cooling can run off. The air flow which is cooled by means of the cooling device 3 is then fed to a filter 12 which removes any impurities from the air flow. The compressed, cooled and cleaned air flow is then fed to the desiccant container 4, where it is to flow through an adsorbent situated in the desiccant container 4, wherein the water stored in the air accumulates on the surface of the adsorbent. The air flow, which has now also been dried, is mostly stored in the downstream pressure reservoir 9 in order to be available to the compressed-air system 1 if required. Another, smaller portion of the air flow leaving the desiccant container 4 is fed to and stored in the regeneration container 5. The flow of heat previously drawn off by the cooling device 3 is at least partially fed to the regeneration container 5, such that the air situated in the regeneration container 5 is heated.

Once the sorption capacity of the adsorbent in the desiccant container 4 is exhausted by drying the air flow flowing through the desiccant container 4, the delivery of air to the compressor 2 is interrupted by means of the switching valve 14, such that the adsorbent situated in the desiccant container 4 can be dried by means of so-called heatless regeneration. By connecting the switching valve 13, the air stored in the regeneration container 5 is channelled away in the reverse direction through the desiccant container 4 and via the valve 13 and the outlet 11 into the environment. Before it enters the desiccant container 4, the compressed air coming from the regeneration container 5 is depressurised to almost ambient pressure by means of a baffle and/or throttle 10 and is thus very dry. It can thus easily sorb the water which has previously accumulated on the surface of the adsorbent and draw it off out of the system. Once the adsorbent in the desiccant container 4 has been regenerated, the valves 13 and 14 can be switched again in order to initiate another adsorption phase.

FIG. 2 shows an assembly 8 which is substantially formed from a cylindrical regeneration container 5, which is embodied as a pressure container, and a tubular cooling helix 6 which encircles the regeneration container 5 in the shape of a spiral.

The space-saving embodiment of the drying device in accordance with the invention is based among other things on the fact that the regeneration container 5 is arranged in the volume encircled by the cooling helix 6. In addition, the heat dispensed by the cooling helix 6 is used to heat the compressed air stored in the regeneration container 5 and so increase its water-sorption capacity. Increasing the water-sorption capacity of the compressed air in the regeneration container 5 enables the amount of compressed air which has to be stored in the regeneration container 5 to be reduced, such that the regeneration container 5—and ultimately also the entire assembly 8—can also be made smaller.

The invention claimed is:

1. A drying device for drying the intake air fed to a compressed-air system of a mobile work machine, comprising:

a cooling device including a cooling coil, which is connected downstream of a compressor in an intake air flow path and configured to draw off heat from intake air coming from the compressor;

a desiccant container connected downstream of the cooling device in the intake air flow path and comprising an adsorbent for removing water from the intake air flowing through the desiccant container; and a regeneration container connected downstream of the desiccant container in the intake air flow path and encircled by the cooling coil, wherein the regeneration container is configured to receive a first portion of the intake air coming from the desiccant container and return it to the desiccant container and which feeds heat, drawn off by the cooling coil and supplied to the regeneration container via thermal radiation, to the received intake air.

2. The drying device according to claim 1, wherein the cooling device is formed by a flow channel having a substantially positive pitch.

3. The drying device according to claim 1, wherein the cooling device forms an assembly with the regeneration container.

4. The drying device according to claim 1, wherein the regeneration container is a substantially cylindrical pressure container.

5. The drying device according to claim 1, wherein a filling capacity of the regeneration container is designed for one complete regeneration of the desiccant container.

6. The drying device according to claim 1, further comprising a pressure reservoir connected downstream of the desiccant container in the intake air flow path and configured to receive a second portion of the intake air coming from the desiccant container and dispense it to the compressed-air system, wherein the adsorption capacity of the desiccant container is designed for one complete charge of the pressure reservoir.

* * * * *